United States Patent
Hong et al.

(10) Patent No.: US 6,620,875 B2
(45) Date of Patent: Sep. 16, 2003

(54) RUBBER COMPOSITIONS AND METHOD FOR INCREASING THE MOONEY SCORCH VALUE

(75) Inventors: Sung W. Hong, Cheshire, CT (US); Martin J. Hannon, Bethany, CT (US); Peter K. Greene, Goshen, CT (US)

(73) Assignee: Uniroyal Chemical Company, Inc., Middlebury, CT (US)

( * ) Notice: Subject to any disclaimer, the term of this patent is extended or adjusted under 35 U.S.C. 154(b) by 0 days.

(21) Appl. No.: 09/945,606

(22) Filed: Sep. 4, 2001

(65) Prior Publication Data
US 2003/0119995 A1 Jun. 26, 2003

(51) Int. Cl.$^7$ ................................................. C08L 3/34
(52) U.S. Cl. ........................ 524/492; 524/392; 524/201; 524/377; 524/378; 525/332.6; 525/333.1; 525/331.8; 525/333.2
(58) Field of Search ............................ 525/332.6, 333.1, 525/333.2, 331.8; 524/492, 201, 609, 500, 377, 378

(56) References Cited

U.S. PATENT DOCUMENTS

| | | | |
|---|---|---|---|
| 3,706,819 A | * 12/1972 | Usamoto et al. | 260/889 |
| 3,846,350 A | * 11/1974 | Schentger | 260/2.5 H |
| 3,897,405 A | * 7/1975 | Son et al. | 260/79.5 NV |
| 4,010,129 A | * 3/1977 | Aron | 260/23.7 M |
| 4,062,797 A | * 12/1977 | Behrens | 252/182 |
| 4,104,218 A | * 8/1978 | Hous | 260/23.7 H |
| 4,157,320 A | * 6/1979 | Yankner et al. | 260/28.5 A |
| 4,399,262 A | * 8/1983 | Jablonski | 525/349 |
| 4,465,807 A | * 8/1984 | Giller et al. | 525/135 |
| 4,588,794 A | * 5/1986 | Oda et al. | 526/169.2 |
| 4,714,734 A | * 12/1987 | Hashimoto et al. | 524/496 |
| 5,004,787 A | * 4/1991 | Tojo et al. | 525/332.1 |
| 5,070,130 A | * 12/1991 | Chasar | 524/430 |
| 5,157,083 A | * 10/1992 | Aonuma et al. | |
| 5,191,028 A | * 3/1993 | Ishioka | 525/332.7 |
| 5,703,151 A | * 12/1997 | Yamamoto et al. | 524/262 |
| 5,905,107 A | * 5/1999 | Well | 524/492 |
| 6,342,559 B1 | * 1/2002 | Takagishi | 524/492 |
| 6,518,367 B1 | * 2/2003 | Yatsuyanagi et al. | 525/332.6 |
| 2002/0007011 A1 | * 1/2002 | Konno et al. | 525/84 |
| 2002/0115767 A1 | * 8/2002 | Cruse et al. | 524/262 |
| 2003/0008954 A1 | * 1/2003 | Tadaki et al. | 524/261 |
| 2003/0013793 A1 | * 1/2003 | Wilson | 524/398 |

FOREIGN PATENT DOCUMENTS

| | | | |
|---|---|---|---|
| EP | 0 761 734 A1 | * 3/1997 | C08K/5/04 |
| JP | 57-73035 A | * 5/1982 | C08L/23/16 |
| JP | 58-142937 A | * 8/1983 | C08L/101/04 |
| JP | 06-209854 | 3/1996 | |
| JP | 10-151202 | 12/1999 | |
| JP | 10-151202 A | * 12/1999 | C08L/9/00 |
| WO | WO 01/94461 A1 | * 12/2001 | C08K/5/40 |

OTHER PUBLICATIONS

Abstract (in English) of JP 57–73035 A.*
JP 58–142937 A Abstract in English.*

* cited by examiner

*Primary Examiner*—David W. Wu
*Assistant Examiner*—Rip A. Lee
(74) *Attorney, Agent, or Firm*—Daniel Reitenbach; Michael E. Carmen

(57) ABSTRACT

A rubber composition is disclosed wherein the rubber composition contains at least (a) a rubber component; (b) a silica filler; (c) a coupling agent; (d) a cure-enhancing amount of at least one polyalkylene oxide; and (e) at least one high molecular weight thiuram disulfide. The compositions may also include suitable amounts of other ingredients such as carbon black, antiozonants, antioxidants, etc.

16 Claims, No Drawings

RUBBER COMPOSITIONS AND METHOD FOR INCREASING THE MOONEY SCORCH VALUE

BACKGROUND OF THE INVENTION

1. Technical Field

This invention relates generally to rubber compositions and a method for increasing the mooney scorch value of the rubber compositions. The rubber compositions are particularly useful for tire tread applications in vehicles, e.g., passenger automobiles and trucks.

2. Description of the Related Art

The tire treads of modern tires must meet performance standards which require a broad range of desirable properties. Generally, three types of performance standards are important in tread compounds. They include good wear resistance, good traction and low rolling resistance. Major tire manufacturers have developed tire tread compounds which provide lower rolling resistance for improved fuel economy and better skid/traction for a safer ride. Thus, rubber compositions suitable for, e.g., tire treads, should exhibit not only desirable strength and elongation, particularly at high temperatures, but also good cracking resistance, good abrasion resistance, desirable skid resistance, low tangent delta values at 60° C. and low frequencies for desirable rolling resistance of the resulting treads. Additionally, a high complex dynamic modulus is necessary for maneuverability and steering control. A high mooney scorch value is further needed for processing safety.

Presently, silica has been added to rubber compositions as a filler to replace some or substantially all of the carbon black filler to improve these properties, e.g., lower rolling resistance. Although more costly than carbon black, the advantages of silica include, for example, improved wet traction, low rolling resistance, etc., with reduced fuel consumption. Indeed, as compared to carbon black, there tends to be a lack of, or at least an insufficient degree of, physical and/or chemical bonding between the silica particles and the rubber to enable the silica to become a reinforcing filler for the rubber thereby giving less strength to the rubber. Therefore, a silica filler system requires the use of coupling agents.

Coupling agents are typically used to enhance the rubber reinforcement characteristics of silica by reacting with both the silica surface and the rubber elastomer molecule. Such coupling agents, for example, may be premixed or pre-reacted with the silica particles or added to the rubber mix during the rubber/silica processing, or mixing, stage. If the coupling agent and silica are added separately to the rubber mix during the rubber/silica processing, or mixing, stage, it is considered that the coupling agent then combines in situ with the silica.

A coupling agent is a bi-functional molecule that will react with the silica at one end thereof and cross-link with the rubber at the other end. In this manner, the reinforcement and strength of the rubber, e.g., the toughness, strength, modulus, tensile and abrasion resistance, are particularly improved. The coupling agent is believed to cover the surface of the silica particle which then hinders the silica from agglomerating with other silica particles. By interfering with the agglomeration process, the dispersion is improved and therefore the wear and fuel consumption are improved.

The use of silica in relatively large proportions for improving various tire properties requires the presence of a sufficient amount of a coupling agent. The coupling agent and silica however retard the cure. Therefore, a silica/coupling agent tread formulation has been found to undesirably slow the cure rate of the rubber. Additionally, by employing high amounts of the coupling agents results in the rubber compositions being more costly since these materials are expensive.

In order to increase the cure rate, secondary accelerators such as, for example, diphenyl guanidine (DPG), have been added to the rubber compositions. However, the use of secondary accelerators, and particularly DPG with polyalkylene oxides, result in the rubber composition having a lower mooney scorch value during its manufacture thereby resulting in decreased processing time. Problems associated with a decreased processing time include, for example, precured compounds and rough surfaces on extruded parts. Additionally, diphenyl guanidine is typically employed in high amounts which result in the rubber compositions being more expensive to manufacture since more material must be used.

It would be desirable to provide a rubber composition which has a decreased cure time and a higher mooney scorch value without sacrificing other physical properties, e.g., tangent delta value. This will allow for better processing of the rubber composition during its manufacture.

SUMMARY OF THE INVENTION

It is an object of the present invention to provide a decreased cure time when forming the rubber compositions herein.

It is also an object of the present invention to provide rubber composition possessing a high mooney scorch value.

In keeping with these and other objects of the present invention, the rubber compositions herein comprise (a) a rubber component; (b) a silica filler; (c) a coupling agent; (d) a cure-enhancing amount of a polyalkylene oxide and (e) a thiuram disulfide having a molecular weight of at least about 400.

By employing a cure-enhancing amount of a polyalkylene oxide, lesser amounts of a coupling agent can be used in forming the rubber compositions resulting in the compositions disclosed herein advantageously possessing a higher cure rate. Accordingly, the delay in cure/vulcanization of rubber observed with the use of silica and coupling agent alone as noted above has been lessened, if not substantively overcome, in many cases by the cure-enhancing amount of the polyalkylene oxides of the present invention. Thus, the polyalkylene oxides herein have been found to increase the cure rate and, in some instances, to fully recapture any cure slow down presumed to have resulted from the use of the silica with higher amounts of a coupling agent relative to the present invention which employs lower amounts of a coupling agent with a polyalkylene oxide in this manner, the polyalkylene oxides have enabled achievement of the silica benefits in full without the prior art disadvantage while also achieving a greater economical advantage by using less materials of the more expensive coupling agent.

Additionally, by further employing a high molecular weight thiuram disulfide, i.e., a thiuram disulfide having a weight average molecular weight ($M_w$) of at least 400, with the polyalkylene oxides, the mooney scorch value of the rubber compositions are increased thereby allowing for better processing of the compositions without sacrificing other physical properties.

The term "phr" is used herein as its art-recognized sense, i.e., as referring to parts of a respective material per one hundred (100) parts by weight of rubber.

The expression "cure-enhancing amount" as applied to the polyalkylene oxide employed in the rubber compositions of this invention shall be understood to mean an amount when employed with the coupling agent provides a decreased cure time of the rubber composition.

DESCRIPTION OF THE PREFERRED EMBODIMENTS

The rubber compositions of this invention contain at least (a) a rubber component; (b) a silica filler; (c) a coupling agent; and (d) a cure-enhancing amount of at least one polyalkylene oxide and (d) a thiuram disulfide having a molecular weight of at least about 400.

The rubber components for use herein are based on highly unsaturated rubbers such as, for example, natural or synthetic rubbers. Representative of the highly unsaturated polymers that can be employed in the practice of this invention are diene rubbers. Such rubbers will ordinarily possess an iodine number of between about 20 to about 450, although highly unsaturated rubbers having a higher or a lower (e.g., of 50–100) iodine number can also be employed. Illustrative of the diene rubbers that can be utilized are polymers based on conjugated dienes such as, for example, 1,3-butadiene; 2-methyl-1,3-butadiene; 1,3-pentadiene; 2,3-dimethyl-1,3-butadiene; and the like, as well as copolymers of such conjugated dienes with monomers such as, for example, styrene, alpha-methylstyrene, acetylene, e.g., vinyl acetylene, acrylonitrile, methacrylonitrile, methyl acrylate, ethyl acrylate, methyl methacrylate, ethyl methacrylate, vinyl acetate, and the like. Preferred highly unsaturated rubbers include natural rubber, cis-polyisoprene, polybutadiene, poly(styrene-butadiene), styrene-isoprene copolymers, isoprene-butadiene copolymers, styrene-isoprene-butadiene tripolymers, polychloroprene, chloro-isobutene-isoprene, nitrile-chloroprene, styrene-chloroprene, and poly (acrylonitrile-butadiene). Moreover, mixtures of two or more highly unsaturated rubbers with elastomers having lesser unsaturation such as EPDM, EPR, butyl or halogenated butyl rubbers are also within the contemplation of the invention.

The silica may be of any type that is known to be useful in connection with the reinforcing of rubber compositions. Examples of suitable silica fillers include, but are not limited to, silica, precipitated silica, amorphous silica, vitreous silica, fumed silica, fused silica, synthetic silicates such as aluminum silicates, alkaline earth metal silicates such as magnesium silicate and calcium silicate, natural silicates such as kaolin and other naturally occurring silicas and the like. Also useful are highly dispersed silicas having, e.g., BET surfaces of from about 5 to about 1000 $m^2/g$ and preferably from about 20 to about 400 $m^2/g$ and primary particle diameters of from about 5 to about 500 nm and preferably from about 10 to about 400 nm. These highly dispersed silicas can be prepared by, for example, precipitation of solutions of silicates or by flame hydrolysis of silicon halides. The silicas can also be present in the form of mixed oxides with other metal oxides such as, for example, Al, Mg, Ca, Ba, Zn, Zr, Ti oxides and the like. Commercially available silica fillers known to one skilled in the art include, e.g., those available from such sources as Cabot Corporation under the Cab-O-Sil® tradename; PPG Industries under the Hi-Sil and Ceptane tradenames; Rhodia under the Zeosil tradename and Degussa AG under the Ultrasil and Coupsil tradenames. Mixtures of two or more silica fillers can be used in preparing the rubber composition of this invention. A preferred silica for use herein is Zeosil 1165MP manufactured by Rhodia.

The silica filler is incorporated into the rubber composition in amounts that can vary widely. Generally, the amount of silica filler can range from about 5 to about 150 phr, preferably from about 15 to about 100 phr and more preferably from about 30 to about 90 phr.

If desired, carbon black fillers can be employed with the silica filler in forming the rubber compositions of this invention. Suitable carbon black fillers include any of the commonly available, commercially-produced carbon blacks known to one skilled in the art. Generally, those having a surface area (EMSA) of at least 20 $m^2/g$ and more preferably at least 35 $m^2/g$. up to 200 $m^2/g$ or higher are preferred. Surface area values used in this application are those determined by ASTM test D-3765 using the cetyltrimethyl-ammonium bromide (CT AB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the rubber compositions of the invention. Typical values for surface areas of usable carbon blacks are summarized in the following Table I.

TABLE I

| Carbon Blacks | |
|---|---|
| ASTM Designation (D-1765-82a) | Surface Area ($m^2/g$) (D-3765) |
| N-110 | 126 |
| N-234 | 120 |
| N-220 | 111 |
| N-339 | 95 |
| N-330 | 83 |

TABLE I-continued

Carbon Blacks

| ASTM Designation (D-1765-82a) | Surface Area (m²/g) (D-3765) |
|---|---|
| N-550 | 42 |
| N-660 | 35 |

The carbon blacks utilized in the invention may be in pelletized form or an unpelletized flocculant mass. Preferably, for ease of handling, pelletized carbon black is preferred. The carbon blacks, if any, are ordinarily incorporated into the rubber composition in amounts ranging from about 1 to about 80 phr and preferably from about 5 to about 50 phr.

In compounding a silica filled rubber composition of the present invention, it is advantageous to employ a coupling agent. Such coupling agents, for example, may be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents are generally composed of a silane which has a constituent component, or moiety, (the silane portion) capable of reacting with the silica surface and, also, a constituent component, or moiety, capable of reacting with the rubber, e.g., a sulfur vulcanizable rubber which contains carbon-to-carbon double bonds, or unsaturation. In this manner, then, the coupling agent acts as a connecting bridge between the silica and the rubber thereby enhancing the rubber reinforcement aspect of the silica.

The silane component of the coupling agent apparently forms a bond to the silica surface, possibly through hydrolysis, and the rubber reactive component of the coupling agent combines with the rubber itself. Generally, the rubber reactive component of the coupling agent is temperature sensitive and tends to combine with the rubber during the final and higher temperature sulfur vulcanization stage, i.e., subsequent to the rubber/silica/coupling mixing stage and after the silane group of the coupling agent has combined with the silica. However, partly because of typical temperature sensitivity of the coupling agent, some degree of combination, or bonding, may occur between the rubber-reactive component of the coupling agent and the rubber during an initial rubber/silica/coupling agent mixing stage and prior to a subsequent vulcanization stage.

Suitable rubber-reactive group components of the coupling agent include, but are not limited to, one or more of groups such as mercapto, amino, vinyl, epoxy, and sulfur groups. Preferably the rubber-reactive group components of the coupling agent is a sulfur or mercapto moiety with a sulfur group being most preferable.

Examples of a coupling agent for use herein are vinyltrichlorosilane, vinyltrimethoxysilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-glycidoxypropylmethyldiethoxysilane, γ-glycidoxypropyltriethoxysilane, γ-methacryloxypropylmethyldimethoxysilane, γ-metlacryloxypropyltrimethoxysilane, γ-methacryloxypropylmethyldiethoxysilanie, γ-methacryloxypropyltriethoxysilane, -β(aminoethyl)-γ-aminopropylmethyldimethoxysilane, N-β(aminoethyl)γ-aminopropyltrimethoxysilane, N-β(aminoethyl)γ-aminopropyltriethoxysilane, γ-aminopropyltrimethoxysilane, γ-aminopropyltriethoxysilane, γ-aminopropyltriethoxysilane, -phenyl-γ-aminopropyltrimethoxysilane, γ-chloropropyltrimethoxysilane, γ-mercaptopropyltrimethoxysilane and combinations thereof.

Representative examples of the preferred sulfur-containing coupling agents are sulfur-containing organosilicon compounds. Specific examples of suitable sulfur-containing organosilicon compounds are of the following general formula:

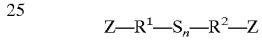

in which Z is selected from the group consisting of

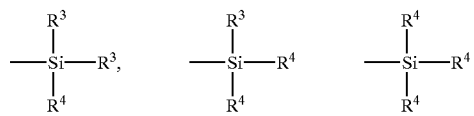

wherein $R^3$ is an alkyl group of from 1 to 4 carbon atoms, cyclohexyl or phenyl; and $R^4$ is an alkoxy of from 1 to 8 carbon atoms, or cycloalkoxy of 5 to 8 carbon atoms; and $R^1$ and $R^2$ are independently a divalent hydrocarbon of from 1 to 18 carbon atoms and n is an integer of from about 2 to about 8.

Specific examples of sulfur-containing organosilicon compounds which may be used herein include, but are not limited to, 3,3'-bis(trimethoxysilylpropyl)disulfide, 3,3'-bis(triethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)triasulfide, 3,3'-bis(triethoxysilylpropyl)triasulfide, 3,3'-bis(tributoxysilylpropyl)disulfide, 3,3'-bis(trimethioxysilylpropyl)hexasufide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilyl-propyl)disulfide, 2,2'-bis(methoxydiethoxysilylethyl)tetrasulfide, 2,2'-bis(tripropoxysilylethyl)pentasulfide, 3,3'-bis(tricyclohexoxysilylpropyl)tetrasulfide, 3,3'-bis(tricyclopentoxysilylpropyl)trisulfide, 2,2'-bis(tri-2"-methyl-cyclohexoxysilylethyl)tetrasulfide, bis(trimethoxysilylmethyl)tetrasulfide, 3-methoxyethoxypropoxysilyl3'-diethoxybutoxysilylpropyltetrasulfide, 2,2'-bis(dimethylmethoxysilylethyl) disulfide, 2,2'-bis(dimethyl sec.butoxysilylethyl)trisulfide, 3,3'-bis(methylbutylethoxysilylpropyl)tetrasulfide, 3,3'-bis (di-t-butylmethoxysilylpropyl)tetrasulfide, 2,2'-bis (phenylmethylmethoxysilylethyl)trisulfide, 3,3'-bis (diphenylisopropoxysilylpropyl)tetrasulfide, 3,3'-bis (diphenylcyclohexoxysilylpropyl) disulfide, 3,3'-bis (dimethylethylmercaptosilylpropyl)tetrasulfide, 2,2'-bis (methoxydiethoxysilylethyl)trisulfide, 2,2'-bis (methylethoxypropoxysilylethyl)tetrasulfide, 3,3'-bis (dietlhylmethoxysilylpropyl)tetrasulfide, 3,3'-bis(ethyl di-sec. butoxysilylpropyl)disulfide, 3,3'-bis (propyldiethoxysilylpropyl)disulfide, 3,3'-bis(butyl dimethoxysilylpropyl)trisulfide, 3,3'-bis (phenyldimethoxysilylpropyl)tetrasulfide, 3-phenylethoxybutoxysilyl 3'-trimethoxysilyipropyl tetrasulfide, 4,4'-bis(trimethoxysilylbutyl)tetrasulfide, 6,6'-bis(triethoxysilylhexyl) tetrasulfide, 12,12'-bis (triisopropoxysilyldodecyl)disulfide, 18,18'-bis (trimethoxysilyloctadecyl)tetrasulfide, 18,18'-bis (tripropoxysilyl-octadecenyl)tetrasulfide, 4,4'-bis (trimethoxysilyl-butene-2-yl)tetrasulfide, 4,4'-bis (trimethoxysilylcyclohexylene)tetrasulfide, 5,5'-bis (dimethoxymethyl-silylpentyl)trisulfide, 3,3'-bis (trimethoxysilyl-2-methylpropyl)tetrasulfide, 3,3'-bis (dimethoxyphenylsilyl-2-methylpropyl)disulfide and the like. Preferred coupling agents for use herein are 3,3'-bis (triethoxysilylpropyl)disulfide and 3,3bis (triethoxysilylpropyl)tetrasulfide.

The polyalkylene oxides used herein advantageously decrease the cure time of the rubber compositions of this invention when added thereto in a cure-enhancing amount. Suitable polyalkylene oxides for use herein can be a polyalkylene oxide which is a polyether of the general formula X(R—O—)$_n$H where R may be one or more of the following groups: methylene, ethylene, propylene or tetramethylene group; n is an integer of from 1 to about 50, preferably from about 2 to about 30 and most preferably from about 4 to about 20; and X is a non-aromatic starter molecule containing 1 to about 12 and preferably 2 to 6 functional groups. Representative of the polyalkylene oxides include, but are not limited to, dimethylene glycol, diethylene glycol, dipropylene glycol, trimethylene glycol, triethylene glycol, tripropylene glycol, polyethylene oxide, polypropylene oxide, polybutylene oxide and the like and mixtures thereof. A preferred polyalkylene oxide for use herein is diethlyene glycol.

By employing the foregoing polyalkylene oxides herein in a cure-enhancing amount, the amount of coupling agent necessary to compound a silica filled rubber composition is reduced thereby providing an economical advantage. Accordingly, amounts of the coupling agent range from about 0.5 to about 10 phr, preferably from about 1 to about 8 phr and most preferably from about 1.5 to about 7 phr while the cure-enhancing amount of the polyalkylene oxide will ordinarily range from about 0.5 to about 10 preferably from about 1 to about 8 and most preferably from about 1.1 to about 5 phr. The foregoing polyalkylene oxides can be, for example, premixed, or blended, with the coupling agents or added to the rubber mix during the rubber/silica/coupling agent processing, or mixing, stage.

The high molecular weight thiuram disulfides for use in the rubber composition of this invention as a secondary accelerator advantageously provide a rubber composition possessing a greater mooney scorch value than that of a similar rubber composition in which a significant amount up to the entire amount of the thiuram disulfide has been replaced with diphenyl guanidine as an accelerator. The thiuram disulfides herein will have a weight average molecular weight of at least 400, preferably from about 500 to about 1250 and most preferably from about 800 to about 1000. Representative of these thiuram disulfides are those of the general formula

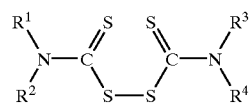

wherein $R^1$, $R^2$, $R^3$ and $R^4$ each are the same or different and are hydrocarbons containing, for example, from about 4 to about 30 carbon atoms, optionally containing one or more heterocyclic groups, or $R^1$ and $R^2$ and/or $R^3$ and $R^4$ together with the nitrogen atom to which they are bonded are joined together to form a heterocyclic group, optionally containing one or more additional heterocyclic atoms. Specific thiuram disulfides include those in which RX, $R^2$, $R^3$ and $R^4$ are independently selected to be t-butyl, pentyl, hexyl, cyclohexyl, heptyl, octyl, 2-ethylhexyl, nonyl, decyl, undecyl, dodecyl, stearyl, oleyl, phenyl, benzyl, tridecyl, tetradecyl, pentadecyl, hexadecyl, heptadecyl, octadecyl, nonadecyl, eicosanyl, and the like. It is particularly advantageous to employ a thiuram disulfide wherein $R^1$, $R^2$, $R^3$ and $R^4$ each possess between 8 to 18 carbon atoms. A particularly preferred thiuram disulfide for use herein is wherein $R^1$, $R^2$, $R^3$ and $R^4$ each possess between 12 and 14 carbon atoms.

Generally, the thiuram disulfide is present in the rubber composition of this invention in an amount ranging from about 0.10 to about 1.0 phr, preferably from about 0.15 to about 0.75 phr and most preferably from about 0.20 to about 0.50 phr.

The rubber compositions of this invention can be formulated in any conventional manner. Additionally, at least one other common additive can be added to the rubber compositions of this invention, if desired or necessary, in a suitable amount. Suitable common additives for use herein include vulcanizing agents, activators, retarders, antioxidants, plasticizing oils and softeners, fillers other than silica and carbon black, reinforcing pigments, antiozonants, waxes, tackifier resins, and the like and combinations thereof.

The rubber compositions of this invention are particularly useful when manufactured into articles such as, for example, tires, motor mounts, rubber bushings, power belts, printing rolls, rubber shoe heels and soles, rubber floor tiles, caster wheels, elastomer seals and gaskets, conveyor belt covers, hard rubber battery cases, automobile floor mats, mud flap for trucks, ball mill liners, windshield wiper blades and the like. Preferably, the rubber compositions of this invention are advantageously used in a tire as a component of any or all of the thermosetting rubber-containing portions of the tire. These include the tread, sidewall, and carcass portions intended for, but not exclusive to, a truck tire, passenger tire, off-road vehicle tire, vehicle tire, high speed tire, and motorcycle tire that also contain many different reinforcing layers therein. Such rubber or tire tread compositions in accordance with the invention may be used for the manufacture of tires or for the re-capping of worn tires.

EXAMPLES

The following non-limiting examples are intended to further illustrate the present invention and are not intended to limit the scope of the invention in any manner.

Comparative Examples A–D and Examples 1–3

Employing the ingredients indicated in Tables II and III (which are listed in parts per hundred of rubber by weight), several rubber compositions were compounded in the following manner: the ingredients indicated in Table II were added to an internal mixer and mixed until the materials are incorporated and thoroughly dispersed and discharged from the mixer. Discharge temperatures of about 160° C. are typical. The batch is cooled, and is reintroduced into the mixer along with the ingredients indicated in Table III. The second pass is shorter and discharge temperatures generally run between 93–105° C.

TABLE II

| | PHASE I | | | | | | |
|---|---|---|---|---|---|---|---|
| Comp. Ex./Ex. | A | B | C | D | 1 | 2 | 3 |
| SOLFLEX 1216[1] | 75.00 | 75.00 | 75.00 | 75.00 | 75.00 | 75.00 | 75.00 |
| BUDENE 1207[2] | 25.00 | 25.00 | 25.00 | 25.00 | 25.00 | 25.00 | 25.00 |
| ZEOSIL 1165[3] | 44.00 | 44.00 | 44.00 | 44.00 | 44.00 | 44.00 | 44.00 |
| N234[4] | 32.00 | 32.00 | 32.00 | 32.00 | 32.00 | 32.00 | 32.00 |
| SILQUEST A1289[5] | 3.52 | 1.76 | 1.76 | 1.76 | 1.76 | 1.76 | 1.76 |
| DEG (LIQUID) | 0.00 | 1.76 | 0.00 | 0.00 | 1.76 | 0.00 | 0.00 |
| DIPROPYLENE GLYCOL | 0.00 | 0.00 | 1.76 | 0.00 | 0.00 | 1.76 | 0.00 |
| TRIETHYLENE GLYCOL | 0.00 | 0.00 | 0.00 | 1.76 | 0.00 | 0.00 | 1.76 |
| STEARIC ACID | 1.00 | 1.00 | 1.00 | 1.00 | 1.00 | 1.00 | 1.00 |
| FLEXZONE 7P[6] | 2.00 | 2.00 | 2.00 | 2.00 | 2.00 | 2.00 | 2.00 |
| SUNPROOF IMPROVED | 1.50 | 1.50 | 1.50 | 1.50 | 1.50 | 1.50 | 1.50 |
| SUNDEX 8125[8] | 40.00 | 40.00 | 40.00 | 40.00 | 40.00 | 40.00 | 40.00 |
| MB1: TOTAL | 224.02 | 224.02 | 224.02 | 224.02 | 224.02 | 224.02 | 224.02 |

[1]Solution styrene-butadiene rubber low styrene and medium vinyl content available from Goodyear.
[2]Polybutadiene rubber available from Goodyear.
[3]Highly dispersable silica available from Rhodia.
[4]High surface area carbon black available from Cabot Corp.
[5]Tetrasulfide coupling agent available from OSI Specialty Chemicals.
[6]Paraphenylene diamine available from Uniroyal Chemical Company.
[7]Blend of hydrocarbon waxes available from Uniroyal Chemical Company.
[8]Aromatic oil available from Sun Oil.

TABLE III

| | PHASE II | | | | | | |
|---|---|---|---|---|---|---|---|
| Comp. Ex./Ex. | A | B | C | D | 1 | 2 | 3 |
| MB-1[9] | 224.02 | 224.02 | 224.02 | 224.02 | 224.02 | 224.02 | 224.02 |
| Zinc Oxide | 2.50 | 2.50 | 2.50 | 2.50 | 2.50 | 2.50 | 2.50 |
| Delac NS[10] | 1.50 | 1.50 | 1.50 | 1.50 | 1.50 | 1.50 | 1.50 |
| Diphenyl Guanadine | 1.00 | 1.00 | 1.00 | 1.00 | 0.00 | 0.00 | 0.00 |
| ROYALAC 150[11] | 0.00 | 0.00 | 0.00 | 0.00 | 0.25 | 0.25 | 0.25 |
| SULFUR 21-10[12] | 2.00 | 2.00 | 2.00 | 2.00 | 2.00 | 2.00 | 2.00 |
| TOTAL | 231.02 | 231.02 | 231.02 | 231.02 | 230.27 | 230.27 | 230.27 |

[9]MB-1 is the batch provided as set forth in Table II.
[10]N-t-butyl-2-benzothiazole sulfenamide available from Uniroyal Chemical Company.
[11]Tetraalkyl ($C_{12}$—$C_{14}$) thiuram disulfide available from Uniroyal Chemical Company having an average molecular weight of 916.
[12]Sulfur available from C.P. Hall.

Results

The compounded stocks prepared above were then sheeted out and cut for cure. The samples were cured for the times and at the temperatures indicated in Table IV and their physical properties evaluated. The results are summarized in Table IV below. Note that in Table IV, cure characteristics were determined using a Monsanto rheometer ODR 2000 (1° ARC, 100 cpm): MH is the maximum torque and ML is the minimum torque. Scorch safety ($t_s2$) is the time to 2 units above minimum torque (ML), cure time ($t_{50}$) is the time to 50% of delta torque above minimum and cure time ($t_{90}$) is the time to 90% of delta torque above minimum. Tensile Strength, Elongation and Modulus were measured following procedures in ASTM D-412. Examples 1–3 illustrate a rubber composition within the scope of this invention. Comparative Examples A–D represents a rubber composition outside the scope of this invention.

values for Examples 1–3 were significantly higher than those of Comparative Examples A–D.

Additionally, the 100% and 300% Modulus and % elongation for Examples 1–3 are comparable to those of Examples A–D. Thus, by replacing 1 phr of diphenyl guanidine with 0.25 phr of tetraalkyl ($C_{12}$–$C_{14}$) thiuram disulfide, the scorch safety of the rubber composition has been significantly improved without any sacrifice in physical properties resulting in an economical cost advantage being realized.

Comparative Examples E–H and Examples 4–6

Employing the ingredients indicated in Tables V and VI (which are listed in parts per hundred of rubber by weight), several rubber compositions were compounded in the fol-

TABLE IV

CURED PHYSICAL PROPERTIES

| Comparative Example or Example | A | B | C | D | 1 | 2 | 3 |
|---|---|---|---|---|---|---|---|
| Cured Characteristics obtained at 160° C. | | | | | | | |
| ML (lb-in.) | 6.57 | 6.95 | 6.49 | 7.23 | 7.65 | 7.29 | 7.44 |
| ML (lb-in.) | 34.15 | 36.10 | 34.18 | 36.65 | 34.00 | 32.38 | 34.66 |
| Scorch safety $t_s2$ (min) | 3.07 | 2.82 | 3.35 | 2.65 | 5.42 | 5.97 | 5.24 |
| Cure time $t_{50}$ (min) | 4.71 | 4.32 | 5.01 | 4.15 | 7.95 | 9.11 | 7.69 |
| Cure time $t_{90}$ (min) | 10.23 | 8.52 | 9.25 | 8.43 | 11.71 | 13.88 | 11.41 |
| Cured at 160° C. | | | | | | | |
| Cure Time @ 160° C. (min) | 15.0 | 15.0 | 15.0 | 15.0 | 17.5 | 20.0 | 17.5 |
| 100% Modulus (Mpa) | 2.6 | 2.3 | 2.1 | 2.6 | 2.3 | 2.2 | 2.4 |
| 300% Modulus (Mpa) | 11.9 | 10.2 | 9.3 | 11.0 | 10.2 | 8.8 | 9.8 |
| Tensile Strength (Mpa) | 18.0 | 17.9 | 16.4 | 19.0 | 18.4 | 17.8 | 19.4 |
| Elongation, % at Break | 410.0 | 490.0 | 490.0 | 490.0 | 490.0 | 520.0 | 540.0 |
| Hardness, Shore A. | 56.0 | 59.0 | 57.0 | 59.0 | 59.0 | 57.0 | 59.0 |
| Mooney Scorch (MS at 135° C.) | | | | | | | |
| 3 Pt. Rise Time (min) | 10 | 9 | 10 | 8 | 23 | 27 | 22 |
| Mooney Viscosity($ML_{1+4}$ at 100° C.) | | | | | | | |
| $ML_{1+4}$ | 71 | 62 | 61 | 64 | 66 | 63 | 64 |
| Tangent Delta 60° C. (10 Hz) [RPA-2000] % Strain | | | | | | | |
| 0.7 | 0.106 | 0.118 | 0.115 | 0.110 | 0.110 | 0.126 | 0.122 |
| 1.0 | 0.111 | 0.134 | 0.136 | 0.128 | 0.121 | 0.137 | 0.140 |
| 2.0 | 0.139 | 0.171 | 0.173 | 0.153 | 0.157 | 0.174 | 0.161 |
| 5.0 | 0.168 | 0.187 | 0.189 | 0.185 | 0.176 | 0.189 | 0.179 |
| 7.0 | 0.168 | 0.190 | 0.194 | 0.187 | 0.176 | 0.186 | 0.182 |
| 14.0 | 0.158 | 0.185 | 0.191 | 0.184 | 0.173 | 0.182 | 0.178 |
| Dynamic Modulus (G', kPa) % Strain | | | | | | | |
| 0.7 | 3106 | 4200 | 4055 | 4376 | 3535 | 3596 | 3902 |
| 1.0 | 2902 | 3902 | 3727 | 4017 | 3295 | 3355 | 3601 |
| 2.0 | 2495 | 3090 | 3038 | 3358 | 2683 | 2670 | 2880 |
| 5.0 | 1874 | 2299 | 2242 | 2478 | 2092 | 2039 | 2248 |
| 7.0 | 1722 | 2066 | 2010 | 2222 | 1927 | 1869 | 2020 |
| 14.0 | 1427 | 1608 | 1560 | 1720 | 1519 | 1492 | 1597 |

It can be seen from the above data that the examples containing a high molecular weight thiuram disulfide and a polyalkylene oxide (Examples 1–3) provide equivalent to improved performance when compared to the examples containing DPG with no polyalkylene oxide present therein (Comparative Example A) and a polyalkylene oxide with DPG (Comparative Examples B–D). The mooney scorch lowing manner: the ingredients indicated in Table V were added to an internal mixer and mixed until the materials are incorporated and thoroughly dispersed and discharged from the mixer. Discharge temperatures of about 160° C. are typical. The batch is cooled, and is reintroduced into the mixer along with the ingredients indicated in Table VI. The second pass is shorter and discharge temperatures generally run between 93–105° C.

TABLE V

PHASE I

| Comp. Ex./Ex. | E | F | G | H | 4 | 5 | 6 |
|---|---|---|---|---|---|---|---|
| SOLFLEX 1216 | 75.00 | 75.00 | 75.00 | 75.00 | 75.00 | 75.00 | 75.00 |
| BUDENE 1207 | 25.00 | 25.00 | 25.00 | 25.00 | 25.00 | 25.00 | 25.00 |
| ZEOSIL 1165 | 85.00 | 85.00 | 85.00 | 85.00 | 85.00 | 85.00 | 85.00 |
| N234 | 5.00 | 5.00 | 5.00 | 5.00 | 5.00 | 5.00 | 5.00 |
| SILQUEST A1289 | 6.80 | 0.00 | 0.00 | 0.00 | 0.00 | 0.00 | 0.00 |
| DEG/SILQUEST A1289 BLEND[13] | 0.00 | 6.80 | 0.00 | 0.00 | 6.80 | 0.00 | 0.00 |
| DIPROPYLENE GLYCOL/SILQUEST A1289 BLEND[13] | 0.00 | 0.00 | 0.00 | 6.80 | 0.00 | 0.00 | 6.80 |
| TRIETHYLENE GLYCOL/SILQUEST A1289 BLEND[13] | 0.00 | 0.00 | 6.80 | 0.00 | 0.00 | 6.80 | 0.00 |
| STEARIC ACID | 1.00 | 1.00 | 1.00 | 1.00 | 1.00 | 1.00 | 1.00 |
| FLEXZONE 7P | 1.00 | 1.00 | 1.00 | 1.00 | 1.00 | 1.00 | 1.00 |
| SUNPROOF IMPROVED | 0.50 | 0.50 | 0.50 | 0.50 | 0.50 | 0.50 | 0.50 |
| AROMATIC OIL | 44.00 | 44.00 | 44.00 | 44.00 | 44.00 | 44.00 | 44.00 |
| NAUGARD Q[14] | 1.00 | 1.00 | 1.00 | 1.00 | 1.00 | 1.00 | 1.00 |
| MB2: TOTAL | 244.30 | 244.30 | 244.30 | 244.30 | 244.30 | 244.30 | 244.30 |

[13]Polyalkylene oxide/silquest blends are physical blends added to the mix as a combination.
[14]TMQ, an antioxidant available from Uniroyal Chemical.

After the ingredients listed in Table V were mixed and subjected to processing conditions to form the batch as described above, 4.00 phr of zinc oxide was added to each of the batches to bring the total of the MB-2 batch to 248.30 phr for each of the examples. The ingredients listed below in Table VI were then added to the MB-2 batches as set forth below.

TABLE VI

PHASED II

| Comp. Ex./Ex. | E | F | G | R | 4 | 5 | 6 |
|---|---|---|---|---|---|---|---|
| MB-2[15] | 248.30 | 248.30 | 248.30 | 248.30 | 248.30 | 248.30 | 248.30 |
| Delac NS[16] | 1.50 | 1.50 | 1.50 | 1.50 | 1.50 | 1.50 | 1.50 |
| Diphenyl Guanadine | 2.00 | 2.00 | 2.00 | 2.00 | 0.00 | 0.00 | 0.00 |
| ROYALAC 150 | 0.00 | 0.00 | 0.00 | 0.00 | 0.25 | 0.25 | 0.25 |
| SULFUR | 1.80 | 1.80 | 1.80 | 1.80 | 1.80 | 1.80 | 1.80 |
| TOTAL | 253.60 | 253.60 | 253.60 | 253.60 | 251.85 | 251.85 | 251.85 |

[15]MB-2 is the batch provided as set forth in Table V together with 4.00 phr of zinc oxide.
[16]N-t-butyl-2-bezothiazole sulfenamide available from Uniroyal Chemical Company.

Results

The compounded stocks prepared above were then sheeted out and cut for cure. The samples were cured for the times and at the temperatures indicated in Table VII and their physical properties evaluated. The results are summarized in Table VII below. Note that in Table VII, cure characteristics were determined using a Monsanto rheometer ODR 2000 (1° ARC, 100 cpm): MH is the maximum torque and ML is the minimum torque. Scorch safety ($t_s2$) is the time to 2 units above minimum torque (ML), cure time ($t_{50}$) is the time to 50% of delta torque above minimum and cure time ($t_{90}$) is the time to 90% of delta torque above minimum. Tensile Strength, Elongation and Modulus were measured following procedures in ASTM D-412. Examples 4–6 illustrate a rubber composition within the scope of this invention. Comparative Examples E–H represents a rubber composition outside the scope of this invention.

TABLE VII

CURED PHYSICAL PROPERTIES

| Comparative Example or Example | E | F | G | H | 4 | 5 | 6 |
|---|---|---|---|---|---|---|---|
| Cured Characteristics obtained at 160° C. | | | | | | | |
| ML (lb-in.) | 3.9 | 5.0 | 4.6 | 4.8 | 6.3 | 9.2 | 5.5 |
| MH (lb-in.) | 28.4 | 35.7 | 34.8 | 36.7 | 37.2 | 35.7 | 38.0 |
| Scorch safety $t_s2$ (Min) | 1.6 | 0.5 | 0.9 | 0.3 | 1.6 | 2.9 | 0.3 |
| Cure time $t_{50}$ (min) | 5.6 | 3.7 | 4.5 | 4.6 | 5.8 | 5.1 | 7.1 |
| Cure time $t_{90}$ (min) | 22.0 | 14.5 | 16.2 | 13.7 | 16.8 | 1.9 | 17.7 |
| Stress/Strain Unaged at 160° C. | | | | | | | |
| Cure Time @ 160° C. (min) | 25.0 | 17.0 | 19.5 | 17.0 | 19.5 | 15.0 | 20.5 |
| 100% Modulus (Mpa) | 3.2 | 2.7 | 2.7 | 2.2 | 2.3 | 2.1 | 2.2 |
| 300% Modulus (Mpa) | 14.4 | 11.2 | 11.0 | 8.5 | 9.7 | 8.5 | 9.3 |
| Tensile Strength (Mpa) | 18.3 | 17.9 | 18.5 | 19.2 | 19.2 | 18.8 | 18.4 |
| Elongation, % at Break | 350.0 | 430.0 | 440.0 | 560.0 | 500.0 | 520.0 | 490.0 |
| Hardness, Shore A. | 67.0 | 70.0 | 68.0 | 67.0 | 67.0 | 66.0 | 67.0 |
| Mooney Scorch (MS at 135° C.) | | | | | | | |
| 3 Pt. Rise Time (min) | 15.0 | 9.4 | 11.9 | 13.6 | 16.9 | 14.6 | 23.5 |
| 18 Pt. Rise Time (min) | 22.1 | 13.3 | 16.9 | 17.9 | 20.5 | 17.0 | 29.3 |
| Mooney Viscosity($ML_{1+4}$ at 100° C.) | | | | | | | |
| $ML_{1+4}$ | 84 | 83 | 86 | 83 | 80 | 87 | 81 |
| Stress Relaxation (%) | 70.6 | 71.6 | 67.2 | 76.1 | 84.4 | 73.5 | 81.1 |
| Tangent Delta 60° C. (10 Hz) [RPA-2000] | | | | | | | |
| % Strain | | | | | | | |
| 0.7 | 0.088 | 0.061 | 0.063 | 0.051 | 0.052 | 0.037 | 0.053 |
| 1.0 | 0.096 | 0.060 | 0.075 | 0.062 | 0.058 | 0.040 | 0.058 |
| 2.0 | 0.119 | 0.086 | 0.084 | 0.084 | 0.076 | 0.061 | 0.081 |
| 5.0 | 0.156 | 0.141 | 0.134 | 0.136 | 0.132 | 0.125 | 0.130 |
| 7.0 | 0.156 | 0.151 | 0.142 | 0.147 | 0.145 | 0.135 | 0.138 |
| 14.0 | 0.172 | 0.189 | 0.176 | 0.189 | 0.185 | 0.174 | 0.176 |
| Dynamic Modulus (G', Kpa) | | | | | | | |
| % Strain | | | | | | | |
| 0.7 | 4800 | 6687 | 6694 | 7620 | 8002 | 7161 | 6832 |
| 1.0 | 4497 | 6443 | 6399 | 7186 | 7782 | 6967 | 6547 |
| 2.0 | 3866 | 5768 | 5746 | 6451 | 6959 | 6476 | 5902 |
| 5.0 | 3020 | 4303 | 4069 | 4681 | 4945 | 4635 | 4281 |
| 7.0 | 2750 | 3736 | 3522 | 4001 | 4246 | 3989 | 3792 |
| 14.0 | 2068 | 2309 | 2390 | 2517 | 2733 | 2639 | 2455 |
| Din Abrasion | | | | | | | |
| Volume Loss (mm³) | 84.3 | 93.5 | 92.4 | 103.2 | 99.9 | 102.7 | 92.0 |
| Abrasion Index | 147.2 | 132.8 | 134.2 | 120.1 | 124.2 | 120.8 | 134.8 |

It can be seen from the above data that the examples containing a high molecular weight thiuram disulfide and a polyalkylene oxide (Examples 4–6) provide superior performance when compared to the examples containing DPG with no polyalkylene oxide present therein (Comparative Example F) and a polyalkylene oxide with DPG (Comparative Examples F–H).

When comparing Example 4 and Comparative Example F, the mooney scorch value was significantly higher without any sacrifice in other physical properties, e.g., tangent delta value, by replacing DPG with a high molecular weight thiuram disulfide. Additionally, the cure time for Example 4 was relatively equivalent to that of Comparative Example F.

Examples 5 and 6 likewise possessed a significantly higher mooney scorch value when compared to Comparative Examples G and H, respectively, while also having relatively equivalent cure times. The tangent delta value for Examples 5 and 6 was lower than that of Comparative Examples G and H1, which is desirable in rubber compositions.

Additionally, the 100% and 300% Modulus and % elongation for Examples 4–6 were either comparable or better than those of Examples E–H. Thus, by replacing 2 phr of diphenyl guanadine with 0.25 phr of tetralkyl ($C_{12}$–$C_{14}$) thiuram disulfide, the scorch safety of the rubber composition has been significantly improved without any sacrifice in physical properties resulting in an economical cost advantage being realized.

Although the invention has been described in its preferred form with a certain degree of particularity, obviously many changes and variations are possible therein and will be apparent to those skilled in the art after reading the foregoing description. It is therefore to be understood that the present invention may be presented otherwise than as specifically described herein without departing from the spirit and scope thereof.

What is claimed is:

1. A rubber composition comprising (a) a rubber component; (b) a silica filler; (c) a coupling agent; (d) a cure-enhancing amount of a polyalkylene oxide; and (e) a thiuram disulfide having a molecular weight of at least about 400.

2. The rubber composition of claim 1 wherein the rubber component is selected from the group consisting of natural rubber, homopolymers of conjugated diolefins, copolymers of conjugated diolefins and ethylenically unsaturated monomers and mixtures thereof.

3. The rubber composition of claim 1 wherein the rubber component is selected from the group consisting of natural rubber, cis-polyisoprene, polybutadiene, poly(styrene-butadiene), styrene-isoprene copolymers, isoprene-butadiene copolymers, styrene-isoprene-butadiene terpolymers, polychloroprene, chloro-isobutene-isoprene, nitrile-chloroprene, styrene-chloroprene, poly (acrylonitrile-butadiene) and ethylene-propylene-diene terpolymer.

4. The rubber composition of claim 1 wherein the silica filler is selected from the group consisting of silica, precipitated silica, amorphous silica, vitreous silica, fumed silica, fused silica, synthetic silicate, alkaline earth metal silicate, highly dispersed silicate and mixtures thereof.

5. The rubber composition of claim 1 wherein the coupling agent is a sulfur-containing coupling agent.

6. The rubber composition of claim 5 wherein the sulfur-containing coupling agent is of the general formula:

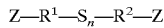

in which Z is selected from the group consisting of

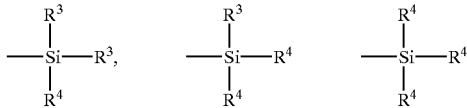

wherein $R^3$ is an alkyl group of from 1 to 4 carbon atoms, cyclohexyl or phenyl; and $R^4$ is an alkoxy of from 1 to 8 carbon atoms, or cycloalkoxy of 5 to 8 carbon atoms; and $R^1$ and $R^2$ are independently a divalent hydrocarbon of from 1 to 18 carbon atoms and n is an integer of from about 2 to about 8.

7. The rubber composition of claim 6 wherein the sulfur-containing coupling agent is selected from the group consisting of 3,3'-bis(trimethylsilylpropyl)disulfide, 3,3'-bis(triethoxysilylpropyl)disulfide, 3,3-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tri-n-butoxysilylpropyl)disulfide, 3,3'-bis(trimethoxysilylpropyl)hexasufide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2'-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxydiethoxysilylethyl)tetrasulfide, 2,2'-bis(tripropoxysilylethyl)pentasulfide, 3,3'-bis(tricyclohexoxysilylpropyl)tetrasulfide, 3,3'-bis(tricyclopentoxysilylpropyl)trisulfide, 2,2'-bis(tri-2'-methylcyclohexoxysilylethyl)tetrasulfide, bis(trimethoxysilylmethyl)tetrasulfide, 3-methoxy ethoxy propoxysilylpropyl 3'-diethoxybutoxy-silylpropyltetrasulfide, 2,2'-bis(dimethylmethoxysilylethyl)disulfide, 2,2'-bis(dimethylsec-butoxysilylethyl)trisulfide, 3,3'-bis(methyl butylethoxysilylpropyl)tetrasulfide, 3,3'-bis(di-t-butylmethoxysilylpropyl)tetrasulfide, 2,2'-bis(phenylmethylmethoxysilylethyl)trisulfide, 3,3'-bis(diphenyl isopropoxysilylpropyl)tetrasulfide, 3,3'-bis(diphenylcyclohexoxysilylpropyl)disulfide, 3,3'-bis(dimethylethylmercaptosilylpropyl)tetrasulfide, 2,2'-bis(methyl dimethoxysilylethyl)trisulfide, 2,2'-bis(methylethoxypropoxysilylethyl)tetrasulfide, 3,3'-bis(diethylmethoxysilylpropyl)tetrasulfide, 3,3'-bis(ethyl-di-sec-butoxysilylpropyl)disulfide, 3,3'-bis(propyldiethoxysilylpropyl)disulfide, 3,3'-bis(n-butyldimethoxysilylpropyl)trisulfide, 3,3'-bis(phenyl dimethoxysilylpropyl)tetrasulfide, 3-phenyl ethoxybutoxysilylpropyl 3'-trimethoxysilylpropyl tetrasulfide, 4,4'-bis(trimethoxysilylbutyl)tetrasulfide, 6,6-bis(triethoxysilylhexyl)tetrasulfide, 12,12'-bis(triisopropoxysilyldodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-butene-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide, 3bis(dimethoxyphenylsilyl-2-methylpropyl)disulfide and combinations thereof.

8. The rubber composition of claim 1 wherein the polyalkylene oxide is selected from the group consisting of dimethylene glycol, diethylene glycol, dipropylene glycol, trimethylene glycol, triethylene glycol, tripropylene glycol, polyethylene oxide, polypropylene oxide, polybutylene oxide and mixtures thereof.

9. The rubber composition of claim 1 wherein the thiuram disulfide is of the general formula

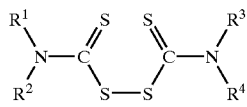

wherein $R^1$, $R^2$, $R^3$ and $R^4$ each are the same or different and are hydrocarbons containing from 4 to 30 carbon atoms, optionally containing one or more heterocyclic groups, or $R^1$ and $R^2$ and/or $R^3$ and $R^4$ together with the nitrogen atom to which they are bonded are joined together to form a heterocyclic group, optionally containing one or more additional heterocyclic atoms.

10. The rubber composition of claim 9 wherein $R^1$, $R^2$, $R^3$ and $R^4$ each are the same or different and are hydrocarbons containing from about 8 to about 18 carbon atoms.

11. The rubber composition of claim 9 wherein $R^1$, $R^2$, $R^3$ and $R^4$ each are hydrocarbons of between 12 and 14 carbon atoms.

12. The rubber compositions of claim 9 wherein the polyalkylene oxide is diethylene glycol and $R^1$, $R^2$, $R^3$ and $R^4$ each are hydrocarbons of between 12 and 14 carbon atoms.

13. The rubber composition of claim 12 wherein the silica filler is present in an amount of from about 5 to about 100 phr, the sulfur-containing coupling agent is present in an amount from about 0.5 to about 10 phr, diethylene glycol is present in an amount of from about 0.5 to about 10 phr and the thiuram disulfide is present in an amount from about 0.1 to about 1.0.

14. The rubber composition of claim 1 wherein the silica filler is present in an amount of from about 5 to about 100 phr, the coupling agent is present in an amount of from about 0.5 to about 10 phr, the polyalkylene oxide is present in an amount of from about 0.5 to about 10 phr and the thiuram disulfide is present in an amount of from about 0.1 to about 1.0 phr.

15. A product comprising the rubber composition of claim 1 selected from the group consisting of tire treads, motor mounts, rubber bushings, power belts, printing rolls, rubber shoe heels and soles, rubber floor tiles, caster wheels, elastomer seals and gaskets, conveyor belt covers, hard rubber battery cases, automobile floor mats, truck mud flaps, ball mill liners and windshield wiper blades.

16. The rubber composition of claim 1 further comprising at least one other additive selected from the group consisting of vulcanizing agents, activators, fillers other than silica, retarders, antioxidants, plasticizing oils, and softeners, reinforcing pigments, antiozonants, waxes, tackifier resins and combinations thereof.

\* \* \* \* \*